United States Patent
Ko et al.

(10) Patent No.: US 8,387,140 B2
(45) Date of Patent: Feb. 26, 2013

(54) METHOD AND APPARATUS FOR CONTROLLING ACCESS TO ENCRYPTED NETWORK COMMUNICATION CHANNELS

(75) Inventors: Steve S. Ko, San Francisco, CA (US); Giovanni Donelli, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 12/905,228

(22) Filed: Oct. 15, 2010

(65) Prior Publication Data

US 2012/0096261 A1 Apr. 19, 2012

(51) Int. Cl.
*G06F 11/00* (2006.01)
(52) U.S. Cl. .......................................................... 726/22
(58) Field of Classification Search .............. 726/22–24; 713/151, 165, 168; 709/224, 225
See application file for complete search history.

(56) References Cited

U.S. PATENT DOCUMENTS

| | | | |
|---|---|---|---|
| 6,742,047 B1 | 5/2004 | Tso | |
| 6,772,214 B1 | 8/2004 | McClain et al. | |
| 7,334,037 B2 | 2/2008 | Woods et al. | |
| 7,650,420 B2 | 1/2010 | Chong et al. | |
| 7,730,040 B2 * | 6/2010 | Reasor et al. | 707/690 |
| 7,821,970 B2 * | 10/2010 | White et al. | 370/255 |
| 8,001,606 B1 * | 8/2011 | Spertus | 726/25 |
| 8,015,606 B1 * | 9/2011 | Jevans et al. | 726/22 |
| 2010/0083376 A1 * | 4/2010 | Pereira et al. | 726/22 |

* cited by examiner

*Primary Examiner* — Beemnet Dada
(74) *Attorney, Agent, or Firm* — Womble Carlyle Sandridge & Rice LLP

(57) ABSTRACT

An apparatus and method are described for performing content filtering of encrypted network transactions. For example, in one embodiment, for an encrypted Internet transaction (such as an HTTPS transaction), a local cache lookup is performed using the network address of the requested Internet transaction to determine if name resolution data associated with the transaction is stored in a name resolution data cache. If name resolution data associated with the transaction is stored in the name resolution data cache, then the name resolution data is compared with a whitelist of acceptable Internet names. The requested Internet transaction is allowed only if a match is found between the name resolution data and one of the Internet names on the whitelist.

18 Claims, 7 Drawing Sheets

METHOD AND APPARATUS FOR CONTROLLING ACCESS TO ENCRYPTED NETWORK COMMUNICATION CHANNELS

BACKGROUND

1. Field of the Invention

This invention relates generally to the field of network transactions. More particularly, the invention relates to an apparatus and method for controlling access to encrypted network communication channels.

2. Description of the Related Art

A variety of techniques have been developed for filtering undesirable Internet content including simple techniques such as blacklisting undesirable Websites and more complex techniques such as performing a semantic analysis of Web page content. As illustrated in FIG. 1, a content filtering application 102 is typically configured between browser application 101 on a computer system 190 and Web servers 110-111 on the Internet 105. Content filtering data 103 specifies the manner in which the content filtering application 102 should block content from the Internet. The content filtering data 103 may include, for example, a blacklist of undesirable Websites. Requests from the browser application 101 directed to the blacklisted websites are then blocked by the content filtering application 102. In more complex implementations, the content filtering data 103 may specify certain words, word combinations, or other types of data signatures which the content filtering application 102 may use to perform a semantic analysis of requested Internet content. The content filtering application 102 will then block requests for content which fail the semantic analysis (e.g., blocking any requested content containing the words "sex", "porn", "XXX", "Viagra", or any specified combination thereof).

Current content filtering applications, however, are incapable of performing an analysis of encrypted Internet transactions where the data channel between the browser application 101 and Web servers 110-111 is encrypted. For example, because HTTPS (Hypertext Transport Protocol Secure) transactions use public/private keys to encrypt data, and these keys are not made available to the content filtering application 102, there is no way for the content filtering application to evaluate the Web pages being requested, or even the Website URL from which the Web pages are requested (because all of this information is encrypted between the browser application and the Web server). Consequently, current content filtering applications often block all HTTPS traffic rather than risking the receipt of undesirable content over an HTTPS communication channel.

More advanced content filtering applications may attempt to perform a "reverse DNS lookup" to attempt to determine the Website to which an HTTPS request is directed. Using reverse DNS, the content filtering application 102 requests the domain name associated with a particular IP address to which the HTTPS request is directed (the IP address one piece of information which is not encrypted in an HTTPS connection). The problem with this technique is that a 1:1 mapping often does not exist between an IP address and domain name. For example, domain names often map to a series of IP addresses. Conversely, a single IP address may be used for multiple different domain names. Consequently, reverse DNS lookups provide unpredictable results.

Consequently, new techniques are needed for performing content filtering of encrypted Internet transactions.

SUMMARY

An apparatus and method are described for performing content filtering of encrypted network transactions. For example, in one embodiment, for an encrypted Internet transaction (such as an HTTPS transaction), a local cache lookup is performed using the network address of the requested Internet transaction to determine if name resolution data associated with the transaction is stored in a name resolution data cache. If name resolution data associated with the transaction is stored in the name resolution data cache, then the name resolution data is compared with a whitelist of acceptable Internet names. The requested Internet transaction is allowed only if a match is found between the name resolution data and one of the Internet names on the whitelist.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention addresses the problems associated with filtering encrypted Internet transactions by locally caching name resolution data (e.g., domain name-IP address pairs). In response to detecting an encrypted request for Internet content, the content filtering application queries the cache using the IP address associated with the request (or other type of network address in a non-IP implementation). If a domain name such as a URL is associated with the IP address in the cache, the domain name may then be checked against a whitelist of known acceptable domain names. However, if the domain name is not on the whitelist, or if an entry corresponding to the IP address is not in the cache, then the content filtering application may block the request.

Figure 1:
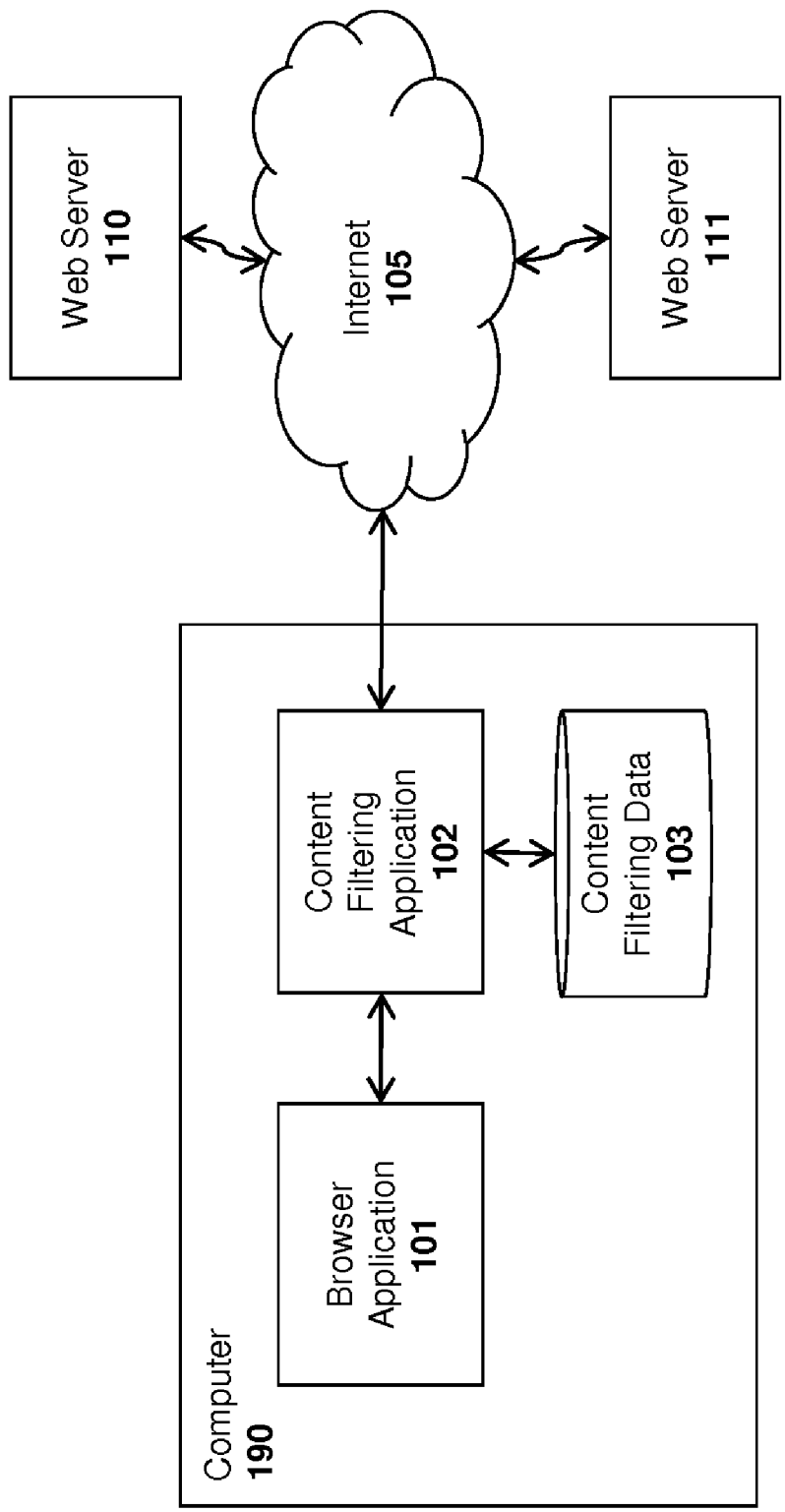
FIG. 1 illustrates a prior art architecture for filtering undesirable Internet content.
Figure 2:
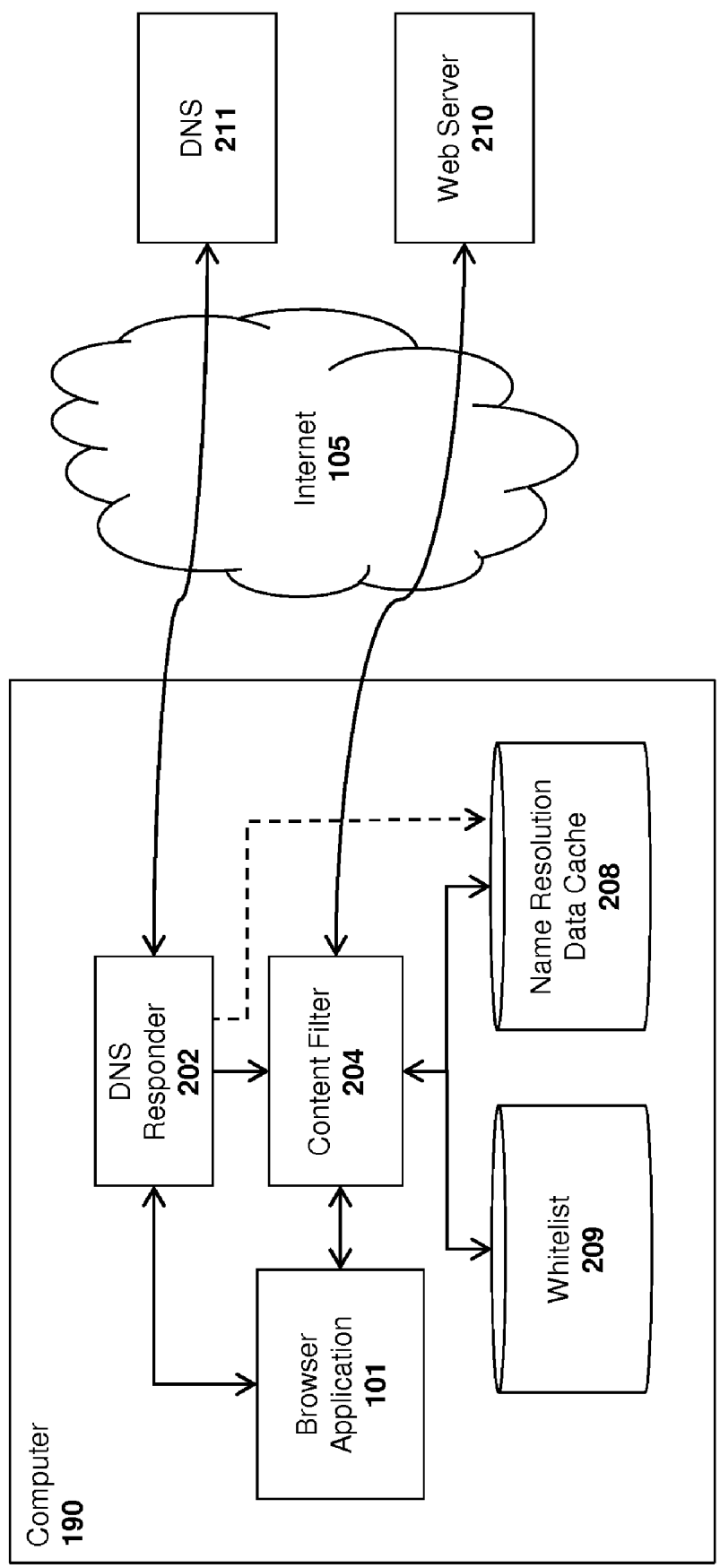
FIG. 2 illustrates one embodiment of a system architecture for filtering undesirable Internet content.

As illustrated in FIG. 2, this embodiment of the invention includes a domain name service (DNS) responder module 202 which performs domain name resolution operations on behalf of the browser application 101. In one embodiment, the DNS responder module 202 is a daemon which receives domain name lookup requests from the browser application 101 and, in response, communicates with the domain name service 211 to resolve the requests into IP addresses. The specific details associated with these DNS transactions are well known by those of skill in the art and are beyond the scope of the present patent application. Once a domain name has been successfully resolved, the DNS responder 202 may then provide the IP address to the browser application 101, which may then use the IP address to communicate with the Web server 210 identified by the domain name.

As illustrated in FIG. 2, in one embodiment of the invention, the DNS responder module 202 automatically stores updates of the domain names/URLs and corresponding IP addresses within a name resolution data cache 208. The DNS responder 202 may provide the updates to the content filter application 204 which stores the updates in the cache or, alternatively, the DNS responder 202 may store the name-address mappings directly in the cache 208 (bypassing the content filter module 204 as indicated by the dotted line in FIG. 2). In one embodiment, the name resolution data cache 208 is implemented as a ring buffer having a specified number of entries (e.g., 1000 entries). Using a ring buffer implementation, when the cache is filled with the specified number of name-address entries, the oldest entries are overwritten with newer entries.

Regardless of how the name resolution data cache 208 is implemented, in one embodiment, when a user attempts to open an encrypted connection to a Web server, the content filter module uses the IP address associated with the Web server to query the data cache 208. If an entry exists for the IP address, the content filter application 204 may retrieve the domain name (e.g., the URL) corresponding to that IP address from the name resolution data cache 208 and compare the domain name against a whitelist 209 of acceptable domain names/URLs. If the domain name is on the whitelist, then the content filter application 204 may allow the browser to receive Web pages from the Web server 210 identified by the domain name. In one embodiment, if the domain name is not on the whitelist 209 and/or if no entry exists for the IP address in the name resolution data cache 208, then the content filter application blocks Web pages from the Web server 210 identified by the IP address.

The foregoing techniques provide an improved solution to prior content filtering applications by caching a name-address pairing for the most recently accessed websites recorded by the DNS responder module 202. In one embodiment, the DNS responder module is the single point built into the operating system of the computer 190 through which domain names such as URLs are resolved into IP addresses. While name-address mappings may be different over time, in the recent cache the pairing between name and IP address is likely to be correct. This allows the content filtering application 204 to perform its analysis and make a determination as to whether the Website is appropriate or not, even if it is an HTTPS website (i.e., because the DNS responder 202 must be provided with access to the unencrypted domain name so that it can perform DNS resolution operations).

In a typical implementation, certain users with restricted access will be subject to content filtering whereas other users will have unrestricted access. Thus, the name resolution data cache 208 will be populated with various HTTPS Websites as the unrestricted users browse the Internet. For example, a parent may establish an account with restricted access for a child on the computer system 190. While the parent is browsing the Internet with unrestricted access, he/she may visit HTTPS Websites and, as a result, the domain names and associated IP addresses of those Websites may be stored within the name resolution data cache 208. Subsequently, when the child with restricted access is browsing the Internet and attempts to access one of the HTTPS Websites, the content filtering application 204 may query the name resolution data cache 208, extract the domain name associated with the IP address, and compare the domain name against the whitelist 209, as described above.

Figure 3:
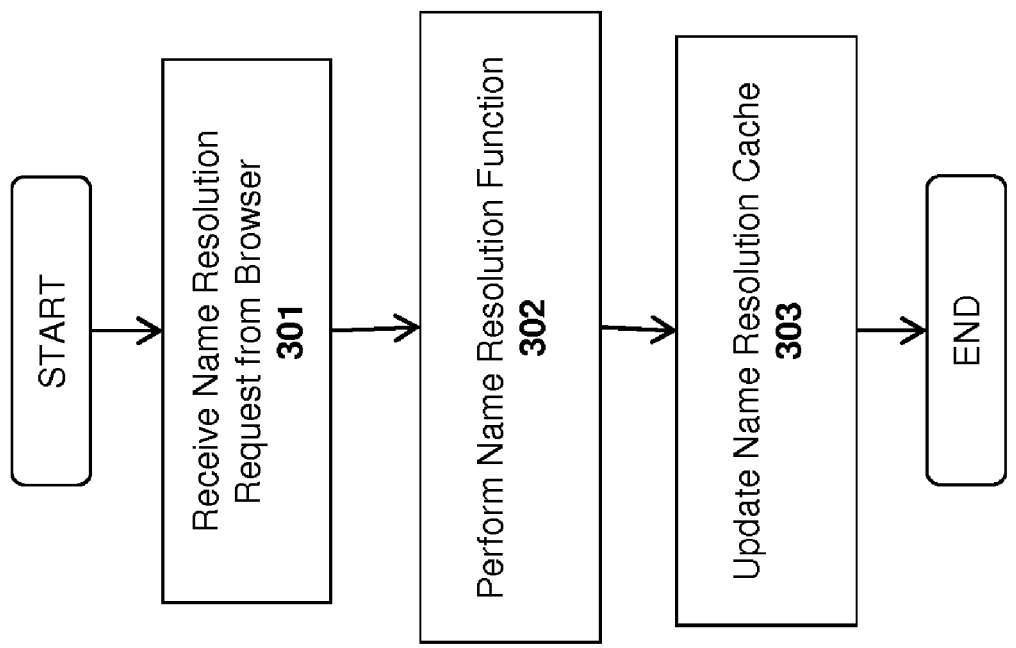
FIG. 3 illustrates one embodiment of a method for caching name resolution data according to one embodiment of the invention.

One embodiment of a method for updating a name resolution cache is illustrated in FIG. 3. The method may be implemented on the system shown in FIG. 2 but is not limitation to any particular system architecture. At 301, a name resolution request including a domain name is received from a browser application. In one embodiment, the domain name comprise a URL entered by a user or clicked on via a Web page hyperlink. At 302, a name resolution function is performed to resolve the domain name into an IP address. For example, the domain name "google.com" may be resolved into a current IP address for "google.com." Moreover, the name resolution function may require a chain of resolutions with the domain name service prior to arriving at the final IP address for the Website. For example, a first URL may be redirected to one or more additional URLs, each of which may require DNS resolution. At 303, the name resolution cache may be updated with each of the name-address resolutions.

Figure 4:
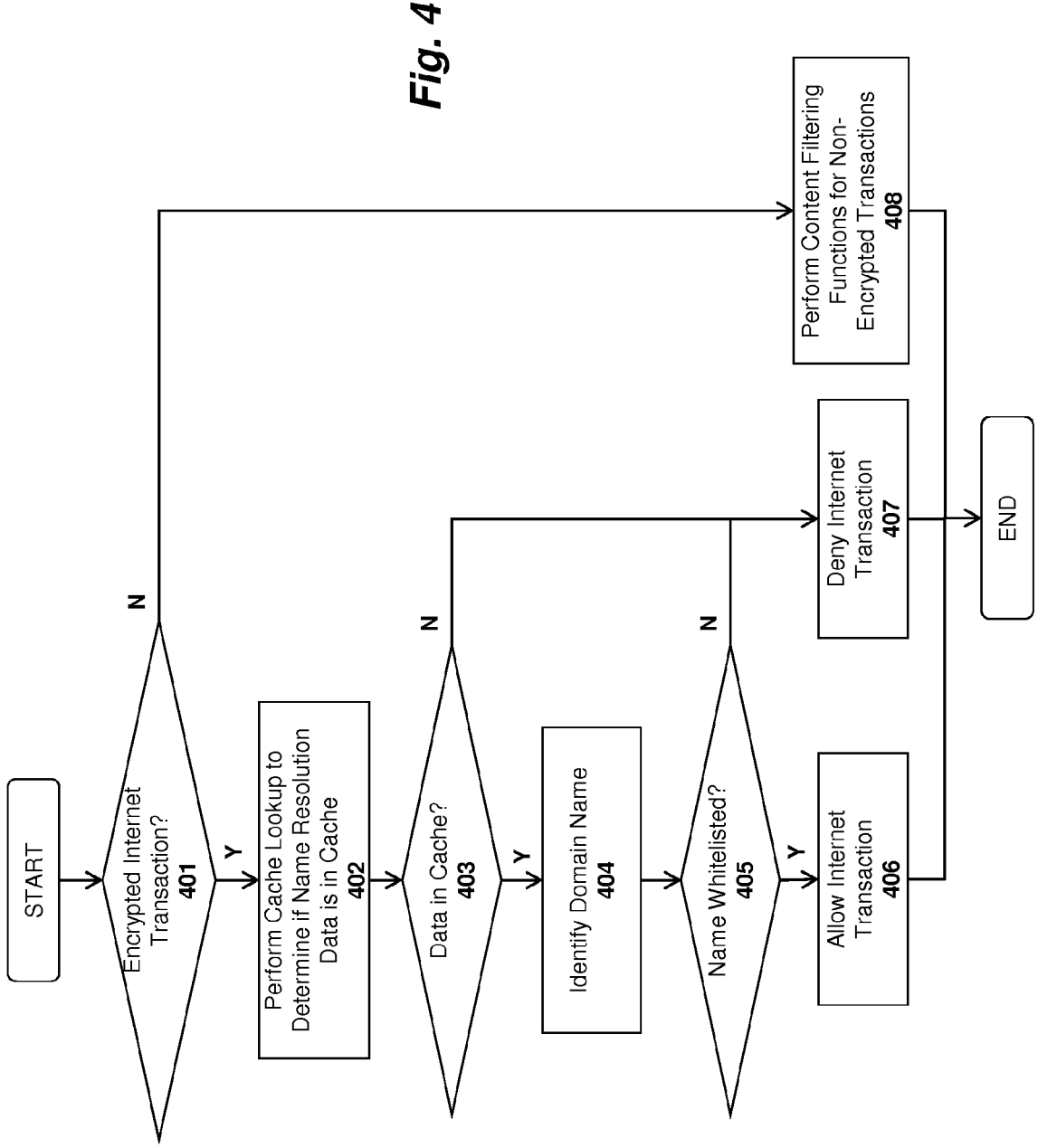
FIG. 4 illustrates one embodiment of a method for using cached name resolution data to filter encrypted Internet content.

One embodiment of a method for using the name resolution data cache for filtering encrypted Internet communications is illustrated in FIG. 4. At 401 a determination is made as to whether an Internet transaction such as a browser Web page request is encrypted (e.g., is an HTTPS request). If not, then at 408, content filtering functions for non-encrypted Internet transactions are implemented. For example, the requested URL may be compared against a whitelist or blacklist and/or more advanced filtering techniques such as semantic textual analysis may be employed. Various additional techniques for filtering undesirable Internet content may also be employed.

If the transaction is an encrypted transaction (e.g., such as an HTTPS request), then at 402 a cache lookup is performed to determine if name resolution data related to the request is stored in the name resolution cache. For example, in one embodiment, the resolved IP address associated with the transaction is used to perform a lookup in the cache. If an entry associated with the IP address exists, determined at 403, then at 404, the domain name associated with the IP address is identified. If not, then at 407, the Internet transaction is denied.

At 405, a determination is made as to whether the domain name retrieved from the cache is whitelisted. For example, in one embodiment of the invention, a user may specify certain HTTPS sites to which access should be provided (e.g., the user's online banking site, electronic payment site, or other sites which require encrypted network traffic for security reasons). If not, then at 407, the Internet transaction is denied. However, if the domain name is on the whitelist, then at 406, the Internet transaction is allowed.

In one embodiment, the DNS responder module 202 described above is the mDNSresponder Bonjour™ system service designed by the assignee of the present application. However, the underlying principles of the invention are not limited to this specific implementation.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention above utilize domain names and IP addresses, the underlying principles of the invention may be implemented using any type of name/address mapping. Moreover, while the embodiments discussed above are implemented within a "computer" 190, the underlying principles of the invention may be implemented on virtually any type of networked computing device including, but not limited to, iPhones, iPads, and Macbooks. Moreover, the content filtering application and other components described above may be implemented within a firewall, router, or other network appliance coupled between the computing device 190 and Web server 210. Accordingly, the scope and spirit of the invention should be judged in terms of the claims below.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 5:
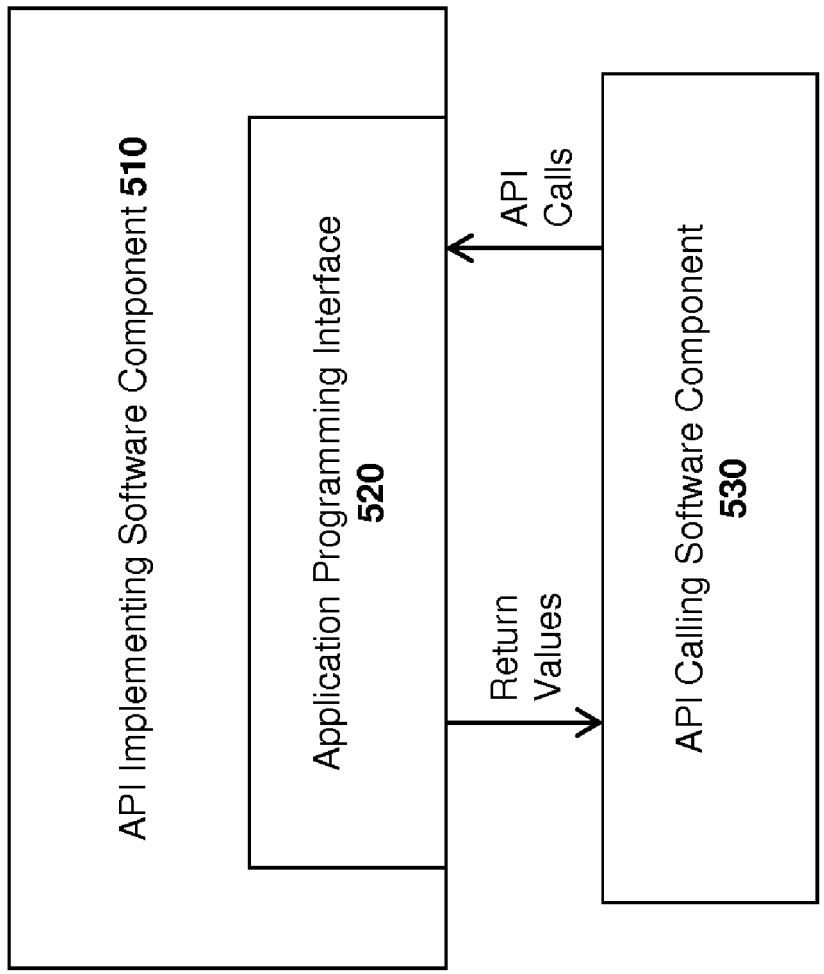
FIG. 5 illustrates a block diagram of an exemplary API architecture useable in some embodiments of the present invention.

FIG. 5 is a block diagram illustrating an exemplary API architecture, which may be used in some embodiments of the invention. As shown in FIG. 5, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 6:
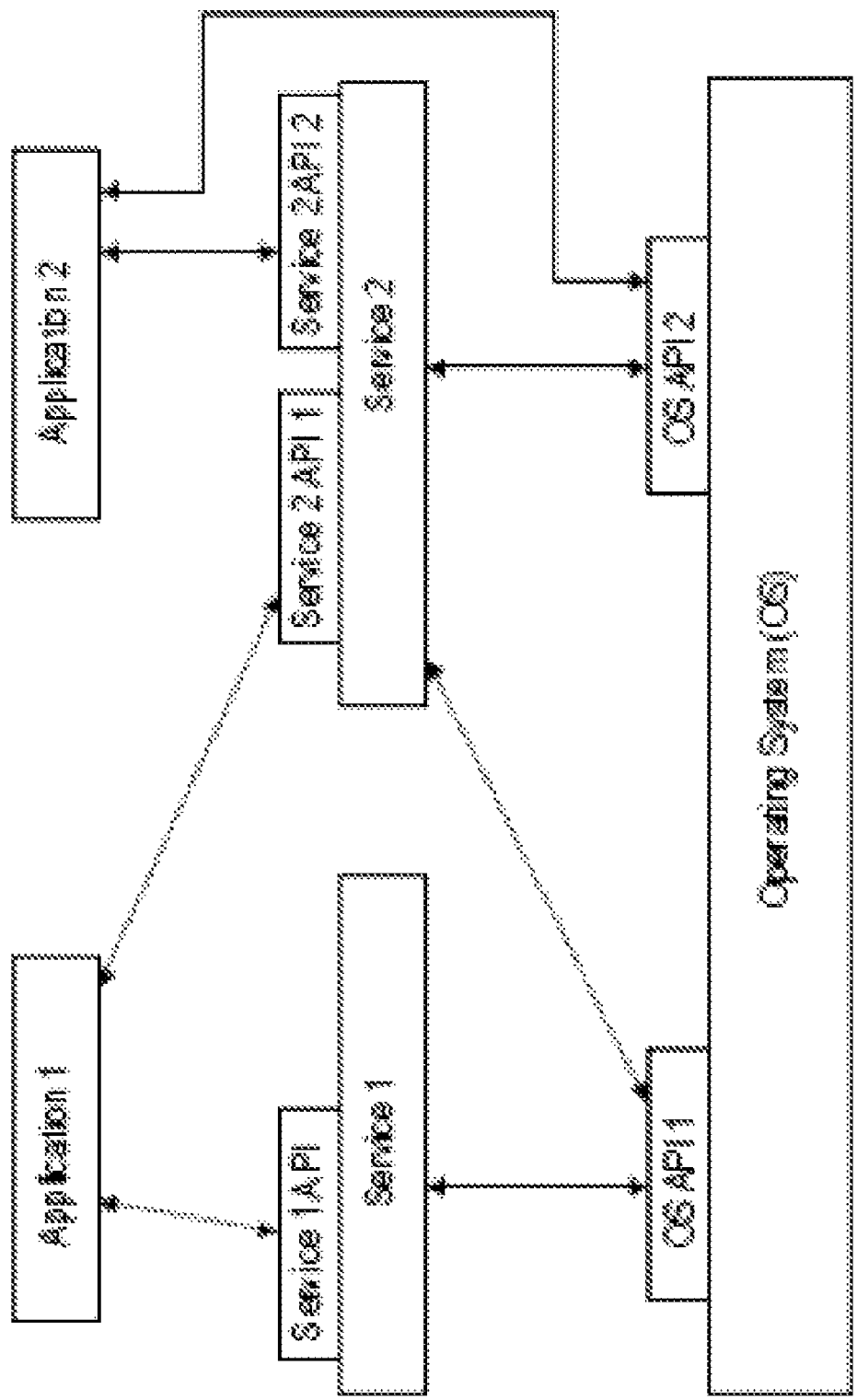
FIG. 6 shows an exemplary embodiment of a software stack useable in some embodiments of the present invention.

In FIG. 6 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 7:
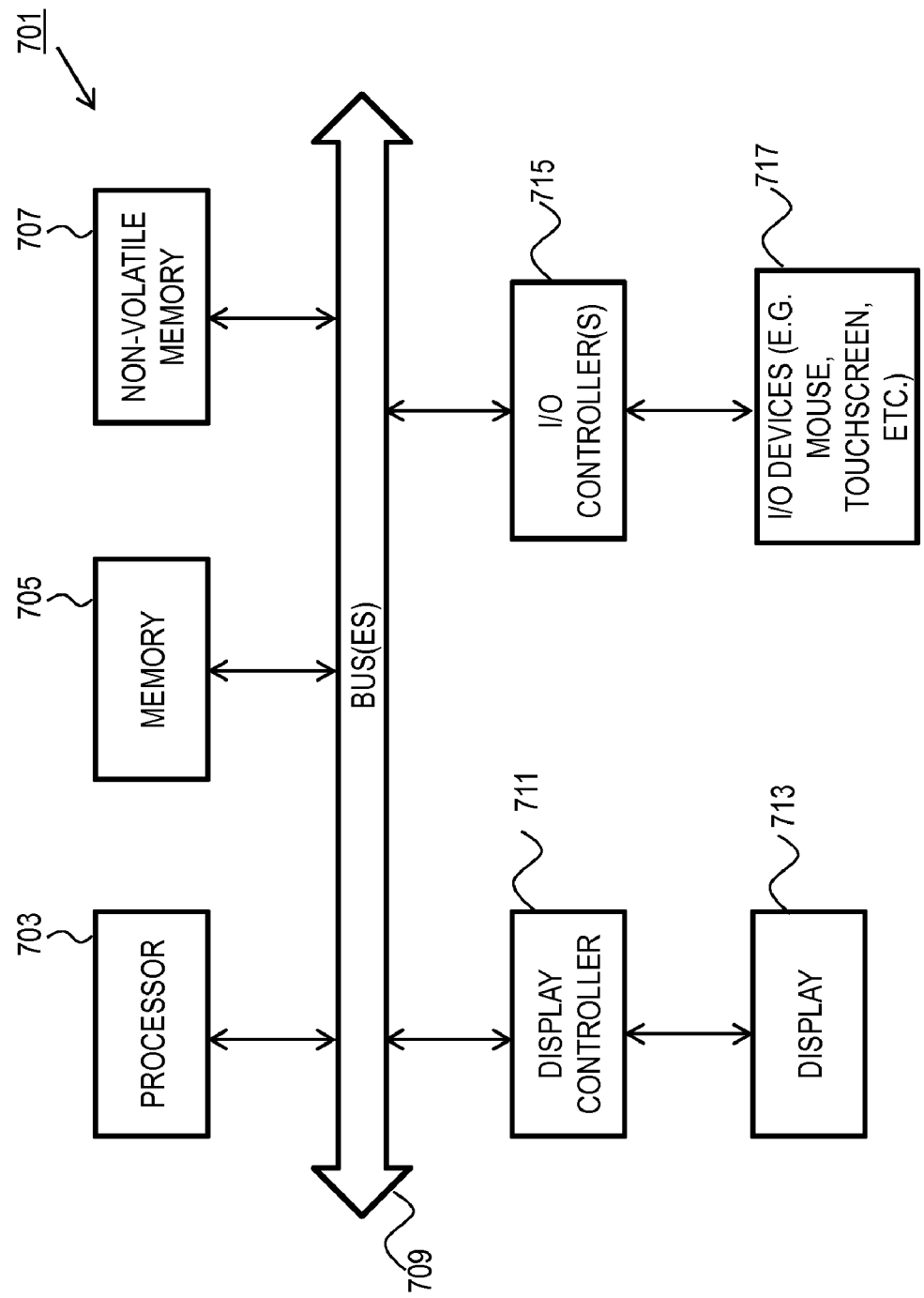
FIG. 7 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 7 shows one example of a typical data processing system which may be used with the present invention. Note that while FIG. 7 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 7 may also be used with the present invention. The data processing system of FIG. 7 may be a Macintosh computer from Apple Inc. of Cupertino, Calif. As shown in FIG. 7, the data processing system 701 includes one or more buses 709 which serve to interconnect the various components of the system. One or more processors 703 are coupled to the one or more buses 709 as is known in the art. Memory 705 may be DRAM or non-volatile RAM or may be flash memory or other types of memory. This memory is coupled to the one or more buses 709 using techniques known in the art. The data processing system 701 can also include non-volatile memory 707 which may be a hard disk drive or a flash memory or a magnetic optical drive or magnetic memory or an optical drive or other types of memory systems which maintain data even after power is removed from the system. The non-volatile memory 707 and the memory 705 are both coupled to the one or more buses 709 using known interfaces and connection techniques. A display controller 711 is coupled to the one or more buses 709 in order to receive display data to be displayed on a display device 713 which can display any one of the user interface features or embodiments described herein. The display device 713 can include an integrated touch input to provide a touch screen. The data processing system 701 can also include one or more input/output (I/O) controllers 715 which provide interfaces for one or more I/O devices, such as one or more mice, touch screens, touch pads, joysticks, and other input devices including those known in the art and output devices (e.g. speakers). The input/output devices 717 are coupled through one or more I/O controllers 715 as is known in the art. While FIG. 7 shows that the non-volatile memory 707 and the memory 705 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 709 may include one or more bridges or controllers or adapters to interconnect between various buses. In one embodiment, the I/O controller 715 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 705 or the non-volatile memory 707 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing content filtering of encrypted network transactions comprising:
   determining whether a requested Internet transaction is an encrypted transaction;
   when the requested Internet transaction is an encrypted transaction, then performing the additional operations of:
      performing a cache lookup using a network address of the requested Internet transaction to determine whether name resolution data associated with the transaction is stored in a name resolution data cache;
      when name resolution data associated with the transaction is stored in the name resolution data cache, then comparing the name resolution data with a whitelist of acceptable Internet names;
      allowing the requested Internet transaction only when a match is found between the name resolution data and one of the Internet names on the whitelist;
   when the requested Internet transaction is not an encrypted transaction, then performing a specified set of content filtering functions for non-encrypted Internet transactions,
      wherein the content filtering functions for non-encrypted Internet transactions comprises comparing the Uniform Resource Locator (URL) of the requested Web page against a blacklist.

2. The method as in claim 1 wherein if a match is not found between the name resolution data and one of the Internet names on the whitelist, then denying the requested Internet transaction.

3. The method as in claim 1 wherein the encrypted Internet transaction comprises a Hypertext Transport Protocol Secure (HTTPS) Internet transaction.

4. The method as in claim 1 wherein the name resolution data comprises a domain name of the requested Internet transaction.

5. The method as in claim 1 wherein the name resolution data comprises a Uniform Resource Locator (URL) of the requested Internet transaction.

6. A non-transitory machine-readable medium having program code stored thereon which, when executed by a processor, causes the processor to perform the operations of:
   determining whether a requested Internet transaction is an encrypted transaction;
   when the requested Internet transaction is an encrypted transaction, then performing the additional operations of:
      performing a cache lookup using a network address of the requested Internet transaction to determine whether name resolution data associated with the transaction is stored in a name resolution data cache;
      when name resolution data associated with the transaction is stored in the name resolution data cache, then comparing the name resolution data with a whitelist of acceptable Internet names; and
      allowing the requested Internet transaction only when a match is found between the name resolution data and one of the Internet names on the whitelist;
   when the requested Internet transaction is not an encrypted transaction then performing a specified set of content filtering functions for non-encrypted Internet transactions,
      wherein the content filtering functions for non-encrypted Internet transactions comprises comparing the Uniform Resource Locator (URL) of the requested Web page against a blacklist.

7. The non-transitory machine-readable medium as in claim 6 wherein if a match is not found between the name resolution data and one of the Internet names on the whitelist, then denying the requested Internet transaction.

8. The non-transitory machine-readable medium as in claim 6 wherein the encrypted Internet transaction comprises a Hypertext Transport Protocol Secure (HTTPS) Internet transaction.

9. The non-transitory machine-readable medium as in claim 6 wherein the name resolution data comprises a domain name of the requested Internet transaction.

10. The non-transitory machine-readable medium as in claim 6 wherein the name resolution data comprises a Uniform Resource Locator (URL) of the requested Internet transaction.

11. A computer system comprising:
    a memory for storing program code and a processor for processing the program code to perform the operations of:
       determining whether a requested Internet transaction is an encrypted transaction;
       when the requested Internet transaction is an encrypted transaction, then performing the additional operations of:
          performing a cache lookup using a network address of the requested Internet transaction to determine whether name resolution data associated with the transaction is stored in a name resolution data cache;
          when name resolution data associated with the transaction is stored in the name resolution data cache, then comparing the name resolution data with a whitelist of acceptable Internet names; and allowing the requested Internet transaction only when a match is found between the name resolution data and one of the Internet names on the whitelist;

when the requested Internet transaction is not an encrypted transaction then performing a specified set of content filtering functions for non-encrypted Internet transactions, wherein the content filtering functions for non-encrypted Internet transactions comprises comparing the Uniform Resource Locator (URL) of the requested Web page against a blacklist.

12. The system as in claim 11 wherein if a match is not found between the name resolution data and one of the Internet names on the whitelist, then denying the requested Internet transaction.

13. The system as in claim 11 wherein the encrypted Internet transaction comprises a Hypertext Transport Protocol Secure (HTTPS) Internet transaction.

14. The system as in claim 11 wherein the name resolution data comprises a domain name of the requested Internet transaction.

15. The system as in claim 11 wherein the name resolution data comprises a Uniform Resource Locator (URL) of the requested Internet transaction.

16. The method as in claim 1 wherein the name resolution data is stored in the name resolution data cache in response to a user with unrestricted access visiting the website associated with the name resolution data.

17. The non-transitory machine-readable medium as in claim 6 wherein the name resolution data is stored in the name resolution data cache in response to a user with unrestricted access visiting the website associated with the name resolution data.

18. The system as in claim 11 wherein the name resolution data is stored in the name resolution data cache in response to a user with unrestricted access visiting the website associated with the name resolution data.

* * * * *